(12) United States Patent
Shukla

(10) Patent No.: US 7,763,301 B2
(45) Date of Patent: Jul. 27, 2010

(54) EMULSIFIED LIQUID SHORTENING COMPOSITIONS COMPRISING DIETARY FIBER GEL, WATER AND LIPID

(75) Inventor: Triveni Shukla, New Berlin, WI (US)

(73) Assignee: Z Trim Holdings, Inc., Mundelein, IL (US)

( * ) Notice: Subject to any disclaimer, the term of this patent is extended or adjusted under 35 U.S.C. 154(b) by 919 days.

(21) Appl. No.: 11/491,297

(22) Filed: Jul. 22, 2006

(65) Prior Publication Data

US 2006/0263485 A1     Nov. 23, 2006

Related U.S. Application Data

(63) Continuation-in-part of application No. 10/669,731, filed on Sep. 24, 2003, now abandoned.

(51) Int. Cl.
 *A23D 9/007* (2006.01)
(52) U.S. Cl. ........................ 426/602; 426/804
(58) Field of Classification Search ................. 426/804, 426/602
See application file for complete search history.

(56) References Cited

U.S. PATENT DOCUMENTS

| | | | | |
|---|---|---|---|---|
| 3,658,555 | A | * | 4/1972 | Menz et al. .................. 426/603 |
| 4,996,063 | A | * | 2/1991 | Inglett ......................... 426/21 |
| 5,082,673 | A | * | 1/1992 | Inglett ......................... 426/21 |
| 5,536,523 | A | * | 7/1996 | Blauel et al. ................. 426/603 |
| 5,766,662 | A | * | 6/1998 | Inglett ......................... 426/481 |

OTHER PUBLICATIONS

Anon. 2002. Code of Regulations. 21 CFR 166.110, p. 538-539.*

* cited by examiner

*Primary Examiner*—Carolyn A Paden
(74) *Attorney, Agent, or Firm*—Loeb & Loeb, LLP

(57) ABSTRACT

Emulsified liquid shortening compositions comprising amorphous insoluble dietary fiber gel, water and lipid, as well as a method for making the compositions, are disclosed. According to the present invention, dietary fiber gel can be subjected to micro-particulation by high shear via homogenization and combined with water and lipid. These ingredients are mixed to form a mixture. The mixture can then be subjected to colloid milling or other equivalent methods of emulsification, for example homogenization and ultrasonification treatment, in the presence of food grade emulsifiers, for example lecithin, and the emulsified mixture can be pasteurized. Functional food ingredients such as high omega three and omega six oils and pure omega three and omega six fatty acids, medium chain triglyceride, beta carotene, calcium stearate, vitamin E, bioflavonoids, fagopyritrol, polyphenolic antioxidants of vegetable origin, lycopene, luteine and soluble fiber, for example Beta-Glucan derived from yeast, and other soluble fibers derived from grain, flax seed, and other vegetable and fruit fiber sources can be added prior to mixing for additional health benefits. The compositions are suitable for use in formulated foods to replace all or a portion of fats, oils and liquid shortenings normally contained in the foods to yield lower calorie, lower fat formulations of the foods. The emulsified compositions can also be used on a prorated basis as a vector for the introduction of dietary fiber gels into formulated foods to partially and totally replace other hydrocolloids normally found in formulated foods, thus providing an effective means to reduce production costs of formulated foods.

37 Claims, No Drawings

EMULSIFIED LIQUID SHORTENING COMPOSITIONS COMPRISING DIETARY FIBER GEL, WATER AND LIPID

CROSS-REFERENCE TO RELATED APPLICATIONS

This application is a Continuation-in-Part Application of U.S. patent application Ser. No. 10/669,731 filed on Sep. 24, 2003 now abandoned, the entirety of which is incorporated herein.

STATEMENT REGARDING FEDERALLY SPONSORED RESEARCH/DEVELOPMENT

The present invention does not involve any form of federally sponsored research or development.

BACKGROUND OF THE INVENTION

The present invention relates to emulsified liquid shortening compositions comprising dietary fiber gel, water and lipid. Recent media attention to the global problem of obesity demonstrates a need for greater availability of functional and delicious foods with low caloric and fat content. Another development in recent health science indicates that an increase in consumption of dietary fiber can have significant health benefits such as decreasing blood cholesterol levels, reduction of colon cancer risk and improving digestive tract health and functioning.

In recent years, some companies have begun to offer reduced fat foods. Reduction of fat content of foods, however, generally has an adverse effect on the taste and texture of these foods. Reducing the fat content, for example, can result in gritty textures and dry consistencies and even the addition of an unpalatable "chemical" type taste to an otherwise delicious food. As a result, the consuming public faces the choice of eating delicious, yet high in fat food, or eating healthier food they don't enjoy.

The absence of a means to reduce the fat content of foods while still producing desirably flavored and textured foods presents an unmet need in today's food and beverage industry.

BRIEF SUMMARY OF THE INVENTION

It is an object of the present invention to answer this unmet need by providing a unique composition of matter embodied by emulsified liquid shortening compositions comprising dietary fiber gel for calorie reduced foods, water and fat or oil (herein the fat and oil component is referred to as "lipid"; the compositions are referred to as "emulsified compositions"). One or more of the following functional foods can be added to the composition: high omega three and omega six oils and pure omega three and omega six fatty acids, medium chain triglyceride, beta carotene, calcium stearate, vitamin E, bioflavonoids, fagopyritrol, polyphenolic antioxidants of vegetable origin, lycopene, luteine and soluble fiber, for example Beta-Glucan derived from yeast, and other soluble fibers derived from grain, flax seed, and other vegetable and fruit fiber sources. This emulsified composition can be used as a substitute for traditionally used fats, oils and liquid shortenings. This emulsified composition can also be used on a prorated basis as a vector for the introduction of dietary fiber gels into formulated foods to partially and totally replace other hydrocolloids normally found in formulated foods, thus providing an effective means to reduce production costs of formulated foods. It is another object of the present invention to provide a method of producing said emulsified compositions.

Dietary fiber gel for calorie reduced foods holds the key to meeting this need. Dietary fiber gel for calorie reduced foods (hereinafter, "dietary fiber gel") is fully described in U.S. Pat. No. 5,766,662 (the '662 patent), which is herein incorporated by reference in its entirety. This dietary fiber gel comprises insoluble dietary fibers consisting of morphologically disintegrated cellular structures, and is characterized by its ability to retain large amounts of water. These amorphous insoluble cellulosic fiber gels are produced by shearing agricultural by-products, such as seed brans, hulls, and so forth, under alkaline conditions. Amorphous insoluble cellulosic fiber gels in a hydrated form can exist as gel, and in the dehydrated form as flakes and powders. Additionally, their high viscosity at low solid levels characterizes these dietary fiber gels. Other insoluble fibers derived from cereals, grains and legumes consist of morphologically in tact cellular structures, and thus impart a gritty texture to the foods in which they are contained. The amorphous insoluble cellulosic fiber gels disclosed in the '662 patent (also herein referred to as dietary fiber gels), however, are amorphous in nature and consist of morphologically disintegrated cellular structures; they thus impart a smoother texture than other insoluble fiber formulations. The physically smooth morphology is readily revealed under electron microscopic magnification of amorphous insoluble cellulosic fiber gel. The smooth morphology is also demonstrated by approximately 60 percent to 90 percent reduction in birefringence when compared to microcrystalline dietary fiber products. The smooth morphology reflects the amorphous nature of the insoluble compounds that constitute amorphous insoluble cellulosic fiber gel.

According to the present invention, dietary fiber gel can be subjected to micro-particulation by high shear via homogenization and combined with water and lipid. The resultant product can then be subjected to colloid milling or other equivalent methods of emulsification, for example homogenization and ultrasonification treatment, in the presence of food grade emulsifiers, for example lecithin, and the emulsified mixture can be pasteurized. Functional food ingredients, including, but not limited to, high omega three and omega six oils and pure omega three and omega six fatty acids, medium chain triglyceride, beta carotene, calcium stearate, vitamin E, bioflavonoids, fagopyritrol, polyphenolic antioxidants of vegetable origin, lycopene, luteine and soluble fiber, for example Beta-Glucan derived from yeast, and other soluble fibers derived from grain, flax seed, and other vegetable and fruit fiber sources can be added for further health benefits. The resultant compositions, as well as the method of producing them, are the subject of this invention.

Further objects, advantages and features of the present invention will present themselves in the following detailed description.

DETAILED DESCRIPTION OF THE PREFERRED EMBODIMENT

This invention is directed toward emulsified liquid shortening compositions comprising dietary fiber gel, water and lipid, as well as a method for making the same.

Description of the Emulsified Composition

According to the present invention dietary fiber gel can be provided in combination with water and a lipid component, the combination being an emulsified composition of matter comprising dietary fiber gel, water and lipid. This composition of matter can be pasteurized. Other ingredients, most notably functional food ingredients such as high omega three and omega six oils and pure omega three and omega six fatty acids, medium chain triglyceride, beta carotene, calcium stearate, vitamin E, bioflavonoids, fagopyritrol, polyphenolic antioxidants of vegetable origin, lycopene, luteine and soluble fiber, for example Beta-Glucan derived from yeast, and other soluble fibers derived from grain, flax seed, and other vegetable and fruit fiber sources can be added.

Water content of the composition can be in the range of 30 percent to 80 percent by weight. Dietary fiber gel concentrations can range from 0.3 percent to 20 percent by weight. The dietary fiber gel can be the product of the '662 patent, and can be a cellulose hydrolyzed version thereof. The remainder of the composition comprises lipid, including fats, oils and liquid shortenings, and if included, a functional food ingredient and some combination of functional food ingredients to be further described infra.

The lipid component can comprise any oleic fatty acids, flax seed oil, olive oil, canola oil, corn oil, walnut oil, peanut oil, and any other vegetable oil, and any combination thereof.

Functional food ingredients can be added to the composition to increase the health benefits of prepared foods comprising the emulsified liquid shortening compositions comprising dietary fiber gel for calorie reduced foods, water and lipid. The following functional food ingredients and their respective ranges are given by way of example, but other functional food ingredients, notably fat soluble functional food ingredients, can be added as well. High omega three oils and omega six oils, for example flax seed oil, can be added in concentrations of 1 percent to 50 percent of the overall composition by weight. Pure omega three fatty acids and omega six fatty acids can be added in concentrations ranging from 1 percent to 30 percent of the overall composition by weight. If both pure omega three fatty acids and high omega three oils are used, their respective concentrations can be prorated to give an appropriate end concentration of high omega three fatty acids. If both pure omega six fatty acids and high omega six oils are used, their respective concentrations can be prorated to give an appropriate end concentration of high omega six fatty acids. Medium chain triglyceride can be added in concentrations ranging from 1 percent to 50 percent of the overall composition by weight. Fagopyritrol can be added in concentrations of 0.25 percent to 20 percent of the overall composition by weight. Polyphenolic antioxidants of vegetable origin, for example lycopene, beta carotene, luteine, and bioflavonoids can be added in concentrations ranging from 0.25 percent to 20 percent of the overall composition by weight. Soluble fiber, for example beta Glucan, can be added in concentrations ranging from 5 percent to 15 percent of the overall composition by weight. Any functional food ingredients added to the composition can be added in such concentrations to deliver up to 100 percent, preferably 25 percent to 100 percent, of prevailing recommended daily intake recommendations by the FDA, European Commission, FAQ, Codex Alimentarius, or other international authorities.

Description of Method of Making the Emulsified Composition

At a minimum, the emulsified composition comprises dietary fiber gel, water and lipid. Other ingredients can be added, such as emulsifiers and functional food ingredients.

Emulsifiers are well known in the art, and lecithin is an example of a commonly used emulsifier. Other emulsifiers can be used. Dietary fiber gel is a hydrocolloid and as such has emulsifier properties. Additional emulsifiers can be added on a prorated basis to augment the emulsifier properties of the dietary fiber gel. Emulsifiers such as lecithin, if included, can preferably be added in a concentration ranging from 0.2% to 10.0% so as to deliver a requisite amount of choline, preferably in the range of 0.1 grams to 2.0 grams, per two ounce serving of formulated foods comprising emulsified liquid shortening composition comprising dietary fiber gel for calorie reduced foods, water and lipid.

Functional food ingredients can include high omega three and omega six oils and pure omega three and omega six fatty acids, medium chain triglyceride, beta carotene, calcium stearate, vitamin E, bioflavonoids, fagopyritrol, polyphenolic antioxidants of vegetable origin, lycopene, luteine and soluble fiber, for example beta-glucan derived from yeast, and other soluble fibers derived from grain, flax seed, and other vegetable and fruit fiber sources. Other functional food ingredients that offer health benefits, most notably those functional food ingredients that are fat soluble, can be added as well.

According to the present invention, ingredients to be used are combined and mixed. At a minimum these ingredients comprise dietary fiber gel, water and lipid, but as stated above emulsifier or emulsifiers can be added, as can any of a number of functional food ingredients and a combination thereof. In one preferred embodiment, the dietary fiber gel can be subjected to high shear micro-particulation by colloid milling, homogenization, ultrasonication and any other suitable means prior to combining the dietary fiber gel with the other ingredients. It is sufficient, however, that high shear micro-particulation occurs after the dietary fiber gel has been combined with any and all of the other ingredients.

The resultant mixture can be subjected to micro-particulation by high shear. Methods of micro-particulation can include homogenization and other methods that are well known in the art, such as colloid milling and ultrasonication treatment. In one preferred embodiment the mixture can be homogenized by subjecting it to high pressure, preferably in the range of 1500 pounds per square inch (psi) to 2500 psi, and elevated temperature, preferably in the range of 120 degrees Fahrenheit to 195 degrees Fahrenheit. The resultant product is an emulsified composition. Ideally, this emulsified composition can have fat droplet sizes in the range of 5 microns to 50 microns, but sizes outside this range are possible as well.

In a preferred embodiment, the emulsified composition can be pasteurized. The composition can subsequently be aseptically packaged.

What is claimed is:

1. An emulsified liquid shortening composition for calorie-reduced foods, the emulsified liquid shortening comprising:
   30 percent to 80 percent of water by weight of the composition;
   lipid; and
   0.3 percent to 20 percent of an amorphous insoluble dietary fiber gel by weight of the composition.

2. The composition according to claim 1, wherein the lipid comprises high omega three oil in an amount of 1 percent to 50 percent by weight of the composition.

3. The composition according to claim 1, wherein the lipid comprises pure omega three fatty acid in an amount of 1 percent to 30 percent by weight of the composition.

4. The composition according to claim 1, wherein the lipid comprises a combination of high omega three oil and pure omega three fatty acid in an amount of 1 percent to 30 percent by weight of the composition.

5. The composition according to claim 1, wherein the lipid comprises medium chain triglycerides in an amount of 1 percent to 50 percent by weight of the composition.

6. The composition according to claim 1, further comprising fagopyritrol in an amount of 0.25 percent to 20 percent by weight of the composition.

7. The composition according to claim 1, further comprising lycopene in an amount of 0.25 percent to 20 percent by weight of the composition.

8. The composition according to claim 1, further comprising polyphenolic antioxidants of vegetable origin in an amount of 0.25 percent to 20 percent weight of the composition.

9. The composition according to claim 1, further comprising luteine in an amount of 0.25 percent to 20 percent by weight of the composition.

10. The composition according to claim 1, further comprising beta carotene in an amount of 0.25 percent to 20 percent by weight of the composition.

11. The composition according to claim 1, further comprising calcium stearate in an amount of 0.25 percent to 20 percent by weight of the composition.

12. The composition according to claim 1, further comprising vitamin E in an amount of 0.25 percent to 20 percent by weight of the composition.

13. The composition according to claim 1, further comprising a bioflavonoid, in an amount of 0.25 percent to 20 percent by weight composition.

14. An emulsified liquid shortening composition for reduced-calorie foods, the emulsified liquid shortening comprising:
   30 percent to 80 percent of water by weight of the composition;
   lipid;
   0.3 percent to 20 percent of a cellulose hydrolyzed insoluble dietary fiber gel by weight of the composition.

15. The composition according to claim 14, wherein the lipid comprises high omega three oil in an amount of 1 percent to 50 percent by weight of the composition.

16. The composition according to claim 14, wherein the lipid comprises pure omega three fatty acid in an amount of 1 percent to 30 percent by weight of the composition.

17. The composition according to claim 14, wherein the lipid comprises a combination of high omega three oil and pure omega three fatty acid in an amount of 1 percent to 30 percent by weight of the composition.

18. The composition according to claim 14, wherein the lipid comprises medium chain triglyceride in an amount of 1 percent to 50 percent by weight of the composition.

19. The composition according to claim 14, further comprising fagopyritrol in an amount of 0.25 percent to 20 percent by weight of the composition.

20. The composition according to claim 14, further comprising lycopene in an amount of 0.25 percent to 20 percent by weight of the composition.

21. The composition according to claim 14, further comprising polyphenolic antioxidants of vegetable origin in an amount of 0.25 percent to 20 percent by weight of the composition.

22. The composition according to claim 14, further comprising luteine in an amount of 0.25 percent to 20 percent by weight of the composition.

23. The composition according to claim 14, further comprising beta carotene in an amount of 0.25 percent to 20 percent by weight of the composition.

24. The composition according to claim 14, further comprising calcium stearate in an amount of 0.25 percent to 20 percent by weight of the composition.

25. The composition according to claim 14, further comprising vitamin E in an amount of 0.25 percent to 20 percent by weight of the composition.

26. The composition according to claim 14, further comprising a bioflavonoid in an amount of 0.25 percent to 20 percent by weight of the composition.

27. An emulsified liquid shortening composition for reduced-calorie foods according to any of claims 1-26, further comprising soluble fiber.

28. An emulsified liquid shortening composition for reduced-calorie foods according to any of claims 1-26, further comprising soluble fiber in an amount of 5 percent to 15 percent by weight of the composition, wherein the soluble fiber is beta-glucan fiber derived from yeast or soluble fiber derived from grains.

29. A method of producing an emulsified liquid shortening composition for calorie-reduced foods comprising an insoluble dietary fiber gel, water, and lipid, comprising:
   a. providing water, lipid, and an insoluble dietary fiber gel;
   b. combining the water, the lipid, and the insoluble dietary fiber gel;
   c. mixing the water, the lipid, and the insoluble dietary fiber gel to create a mixture; and
   d. subjecting the mixture to high shear micro-particulation.

30. The method according to claim 29, further comprising
   e. subjecting the mixture to pasteurization.

31. The method according to claim 29, wherein the high shear micro-particulation is accomplished through colloid milling.

32. The method according to claim 29, wherein the high shear micro-particulation is accomplished through ultrasonication treatment.

33. The method according to claim 29, wherein the high shear micro-particulation is accomplished through homogenization.

34. The method according to claim 30, wherein the high shear micro-particulation is accomplished through colloid milling.

35. The method according to claim 30, wherein the high shear micro-particulation is accomplished through ultrasonication treatment.

36. The method according to claim 30, wherein the high shear micro-particulation is accomplished through homogenization.

37. An emulsified liquid shortening composition produced by the method of any of claims 29-36.

* * * * *